2,833,823

METHOD FOR THE SEPARATION OF OPTICALLY ACTIVE ISOMERS OF AMPHETAMINE

Mitchell F. Zienty, Elkhart, Ind., assignor to Miles Laboratories, Inc., Elkhart, Ind., a corporation of Indiana No Drawing. Application August 13, 1953
Serial No. 374,135

7 Claims. (Cl. 260—570.8)

This invention relates to a method of separating mixtures of amphetamine and, more particularly, it relates to a method of separating resolution mixtures of amphetamine which are relatively rich in levo-amphetamine.

According to present practices in the art, resolution of mixtures of amphetamine has been effected by chemical methods which require an optically active reagent. As taught by Leithe, Ber. d. Chem. Gesell. 65, 644 (1932), the dextro rotatory form of amphetamine is obtained as an acid tartrate by resolving the racemic mixture with d-tartaric acid. Conversely, the use of l-tartaric acid will yield the l-amphetamine l-bitartrate which can be decomposed with alkali to form l-amphetamine. In both situations, the particular acid tartrate is obtained as crystals by fractional crystallization. A modification of this chemical method, as represented by U. S. Patent No. 2,276,509, again relies on the optically active d-tartaric acid.

It is obvious that in requiring optically active reagents such prior processes are inherently expensive and accordingly it is the object of my invention to provide a means of resolving racemic mixtures of amphetamine without recourse to optically active reagents.

A further object of my invention is to provide a superior method of obtaining l-amphetamine.

These and other related objects are achieved by my invention wherein I have found that mixtures of amphetamine relatively rich in l-amphetamine can be treated with phosphoric acid in methanol or methanol-water solution to make the diphosphate salt of the base. Thereafter, upon allowing the mixture to crystallize by cooling to 10–15° C. the colorless crystals obtained are essentially pure l-amphetamine-diphosphate having a rotation of —14.70. The mother liquors contain the diphosphate salt of essentially dl-amphetamine-diphosphate.

By one or two recrystallizations from methanol, essentially pure l-amphetamine-diphosphate is obtained exhibiting a rotation of —21.41. This method makes it possible to prepare conveniently and cheaply very pure l-amphetamine which heretofore was obtainable with difficulty and at considerable expense. If the free base is required, the l-amphetamine-diphosphate is decomposed in water solution with strong alkali such as sodium hydroxide and the base isolated by known procedures.

In a similar manner the filtrates containing the dl-amphetamine-diphosphate are concentrated to a small volume or to dryness and the base isolated by known methods. Rotation of the essentially dl-amphetamine-diphosphate is about —0.0055 to —0.099.

This method makes available pure l-amphetamine and also dl-amphetamine from resolution mixtures rich in l-amphetamine.

Likewise, this method may be applied to racemic mixtures or to any mixture of the optically acive forms of amphetamine in which the levo form is present in an amount not substantially less than that of the dextro form. Such a mixture rich in the levo form may, of course, result from initial separations of the dextro form by the aforementioned present-day practices.

Further detailed description of my invention will be found in the following examples.

Example I

To provide an experimental solution, 13.5 g. of l-amphetamine base in 400 cc. methanol was contaminated to the extent of 15 to 20 percent with d-amphetamine. This solution then was treated with 5.8 g. phosphoric acid (85%) and allowed to cool to 25° C. to crystallize statically. After standing for about 3 hours the colorless crystalline solid was collected by suction and dried at 70° C. Yield of crude l-amphetamine-diphosphate: 9.5 g. for a recovery of 51.6 percent. Rotation $[\alpha]_{25}^D =$ —14.70; c.=3.9612 g. in 100 cc. water.

The filtrate was concentrated to dryness under reduced pressure to yield 8.9 g. of amorphous solid, amounting to 48.3 percent recovery. The rotation of this material was $[\alpha]_{25}^D = $—6.0°; c.=2.25 g. in 100 cc. of NaOH. This clearly indicates that the mixture is not as rich in l-amphetamine as was the starting material, the first crop of crystals having eliminated most of the l-isomer as the insoluble and highly crystalline l-amphetamine-diphosphate.

Example II 9.5 g. of crude l-amphetamine-diphosphate, rotation —14.70, was dissolved in 300 cc. of boiling methanol and then cooled to 25° C. Beautiful glistening platelets of l-amphetamine-diphosphate precipitated from solution. The solid was collected by suction and oven dried. Yield 5.1 g. (53.5% recovery) of purified l-amphetamine-diphosphate exhibiting a rotation of $[\alpha]_{25}^D = $—21.41.

Example III

By repeating the steps of Example I but cooling the mixture to 0° instead of 15°, 12.5 g. of l-amphetamine-diphosphate were obtained. The filtrate obtained was cooled to 0° and a second crop of crystals was obtained weighing 0.6 g. The filtrate was then taken to dryness and the resulting residue refluxed with 25 cc. methanol and then cooled to room temperature. This procedure yielded 1.1 g. of solid which were removed by filtration. The total amount of l-amphetamine-diphosphate obtained by these procedures amounted to 14.2 g. (77% recovery). Rotation of the phosphate salt in the filtrate was —0.0055 at 25° C.; c.=4.3 g. in 100 cc. methanol. The free base in the filtrate was isolated in the usual manner to yield 4.6 g. of material (34% recovery).

Example IV

A solution of 13.5 g. of l-amphetamine base obtained by resolution was contaminated with some d-amphetamine in 120 cc. of 90 percent methanol. This was treated with 5.8 g. of phosphoric acid (85%). Soon after mixing, glistening needles of l-amphetamine-diphosphate began to separate. The mixture was allowed to crystallize statically while being cooled to 10° C. The crystalline material was collected by suction and oven dried. Weight of l-amphetamine-diphosphate: 14.2 g. (77% recovery). The mother liquor showed a rotation of $[\alpha]_{25.5}^D = $0.099 for the salt in methanol; c.=3.5 g. in 100 cc. of 90 percent methanol.

Having thus described my invention, what I claim is:

1. A method of separating l-amphetamine from a mixture of l- and d-amphetamine rich in l-amphetamine which comprises making a methanol solution of said mixture, reacting said amphetamine in solution with phosphoric acid, and cooling said reaction solution to crystallize l-amphetamine in diphosphate form.

2. A method according to claim 1 in which the amphetamine mixture is dissolved in absolute methanol.

3. A method according to claim 1 in which the amphetamine is dissolved in a 90 percent methanol-in-water solution.

4. A method of separating l-amphetamine from a mixture of l- and d-amphetamine rich in l-amphetamine which comprises making a methanol solution of said mixture, reacting said amphetamine in solution with phosphoric acid, cooling said reaction solution to crystallize l-amphetamine in diphosphate form, and reacting said diphosphate form with strong alkali.

5. A method of separating l-amphetamine from a methanol solution of d- and l-amphetamine rich in l-amphetamine which comprises adding phosphoric acid to said solution and cooling the product thus formed to crystallize l-amphetamine in diphosphate form.

6. The method of claim 5 in which the solution is an absolute methanolic solution.

7. The method of claim 5 in which the solution is a 90 percent methanol-in-water solution.

References Cited in the file of this patent

UNITED STATES PATENTS

| | | |
|---|---|---|
| 2,507,468 | Groggin | May 9, 1950 |
| 2,650,938 | Gero | Sept. 1, 1953 |

OTHER REFERENCES

Robertson: "Laboratory Prac. of Org. Chem." (1939), pp. 72–3.